Oct. 22, 1940.　　　　J. MÉRY　　　　2,218,763
FILM GATE AND FEEDING DEVICE
Filed Feb. 24, 1939　　　　2 Sheets-Sheet 1
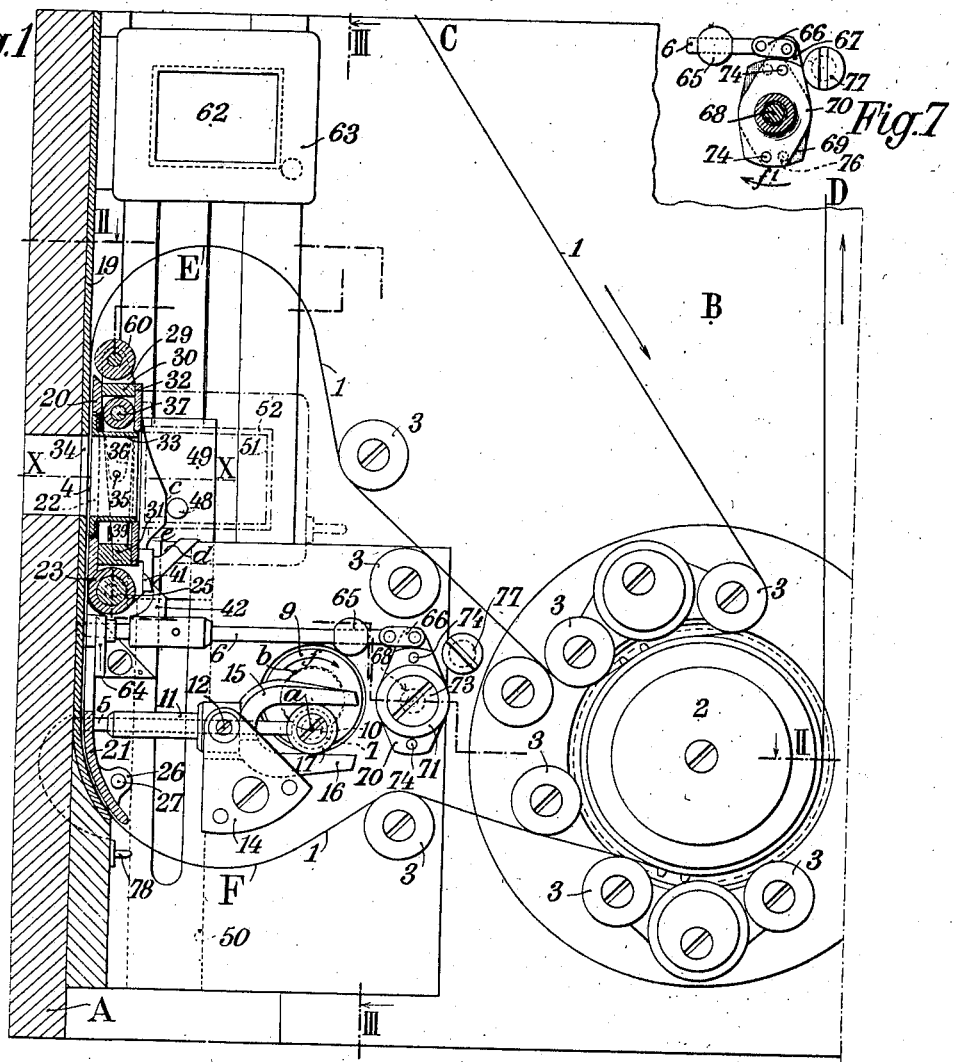
Inventor
J. Méry
By Glascock Downing & Seebold
Attys.

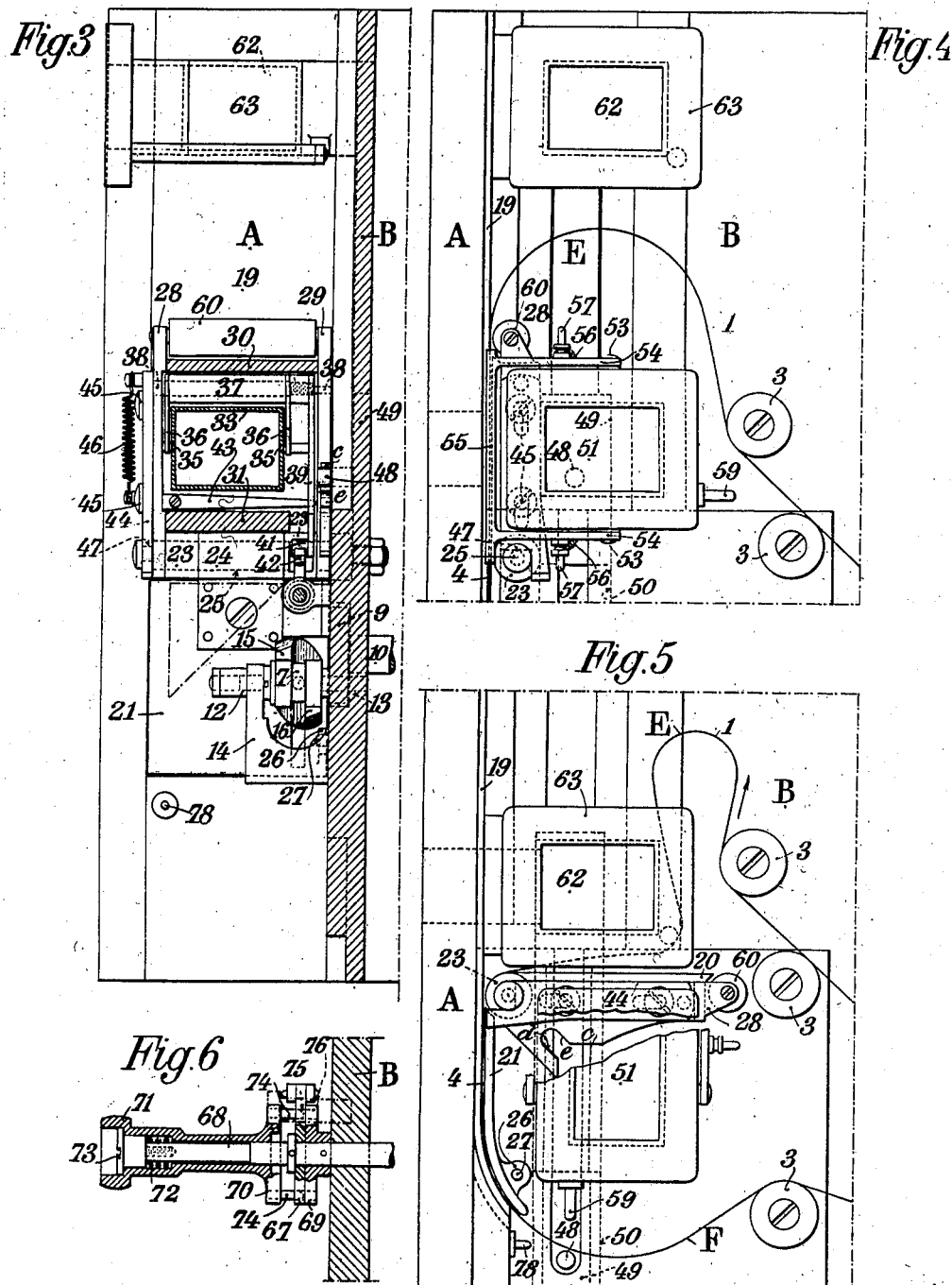

Patented Oct. 22, 1940

2,218,763

UNITED STATES PATENT OFFICE 2,218,763

FILM GATE AND FEEDING DEVICE

Jean Méry, Epinay-sur-Seine, France

Application February 24, 1939, Serial No. 258,321
In France March 30, 1938

9 Claims. (Cl. 88—18.4)

The present invention has for its objects improvements in motion picture cameras to obtain a mechanism of reduced dimensions satisfying all desirable conditions: advance of the film during a period which is short relatively to the period during which it is at rest, progressive driving and stoppage avoiding the mutilation of the perforations, accurate and silent control of the driving and registration claws, guiding of the film avoiding all lateral play in the gate, easy dismantling and cleaning of the gate, easy placing in position and registering of the film, possibility of simultaneously and instantaneously moving the transparent prism and the ground glass prism every time focussing is necessary.

The characteristic arrangement of an apparatus thus improved as well as its operation and its advantages will be described with reference to the accompanying drawings which illustrate a form of construction of the same, by way of example.

Fig. 1 is a front elevation of the mechanism according to the invention, the gate being in vertical section and the transparent prism located opposite the aperture being removed.

Fig. 2 is a plan view partly in section made according to the broken line II—II of Fig. 1, the film being removed.

Fig. 3 is a vertical section made according to the broken line III—III of Fig. 1, without the film.

Fig. 4 is a partial elevation showing both prisms in the upper or normal position.

Fig. 5 is an elevation of the same members in the lower or focussing position.

Fig. 6 is a partial vertical section made according to line VI—VI of Fig. 2, the mechanical control of the registration claw being disengaged.

Fig. 7 is a vertical section made according to line VII—VII of Fig. 2.

The mechanism illustrated is located as usual on the left side of a camera two walls of which are designated by A and B. The path followed by the film 1 is indicated in Fig. 1; said film issuing from the supply magazine placed at C, is moved along by a toothed drum 2 and led, by rolls 3 into a gate 4, then it returns to the drum 2 and to the receiving magazine located at D; during this path it forms two loops E and F on either side of the gate.

The intermittent displacement of the film through the gate 4 is produced by a claw 5 the point of which engages in one of its perforations, lowers according to the height of an image, retracts, rises and begins again, and so on; each time the film is disengaged by said claw, it is held stationary by a claw 6, so-called "registration claw" which engages in another perforation.

The claw 5 consists in a rod terminated by an eye 7 which is mounted with slight friction on a spindle or crank-pin 8 rigid with a plate 9 secured on a control shaft 10. Said rod slides with some friction through a barrel 11 provided with two trunnions 12, 13 which allow it to rock about a horizontal axis in a support 14 secured to the wall B. Said barrel 11 is extended towards the right by a kind of fork constituted by two prongs 15 and 16 arranged in different vertical planes; these prongs respectively bear, by their plane and trued inner faces against the top of a milled wheel 17 and against the bottom of a milled wheel 18, both mounted on the crank-pin 8 on either side of the eye 7 of the claw.

The plate rotating in the direction of the arrow f, its crank-pin imparts to the claw 5 a reciprocating oscillating movement such that the front end of said claw engages in a perforation of the film when the crank-pin 8 has passed the point a of the circumference it describes, it then lowers and draws along the film, then disengages from the latter before reaching the point b, and finally rises to its initial position while the crank-pin returns to a. It will be seen that the arc of circle during which the film is moved downwardly is much smaller than the arc during which said film remains at rest, and that during each period of advancement the movement of the claw is gradually accelerated then slowed down.

Consequently the time during which the film is exposed behind the lens is as long as possible each time for a given speed of advance, this allows of utilising reduced lighting, but the rapid driving of the film is however obtained without damage to the perforations.

It is also to be noted that, owing to the shape of the fork 15, 16 it is possible to obtain a very accurate adjustment of the friction surfaces and to avoid all noise of the mechanism in operation, which is essential for taking sound films.

The gate 4 is formed, on one side, by an aperture plate 19 secured by screws to the wall A and, on the opposite side by a "door" composed of two members 20 and 21 placed one above the other and connected by a hinged joint which allows the upper member 20 to be swung or folded down horizontally, as shown in Fig. 5, with the various elements it supports.

The member 20 is constituted by a plate provided with a rectangular opening 22 and carrying, at its lower part, two hinge members 23 between which is engaged a similar member 24 rigid with the lower plate 21. These hinge members are threaded with slight friction on a pin 25 rigidly secured to the wall B, so that the unit formed by the door 20, 21 and the members it supports, can be easily removed and replaced in position, for instance for allowing the inner walls of the gate to be cleaned. The member 24 is preferably assembled with the members 23 by a circular jointing so that the parts 20 and 21 remain assembled even when they are removed from the pin 25.

When this door is placed in position, the position of its lower member 21 is ensured by the engagement of a perforated lug 26 rigid therewith, on a claw 27 secured to the wall B so that the required interval between the parts 19 and 21 is exactly maintained.

The member 20 carries a kind of rectangular box constituted by two uprights 28, 29, two stays 30, 31 and a plate 32 comprising a rectangular opening located opposite the opening 22; these two openings receive the pressing frame 33 which serves to press the film against the edges of the opening 34 perforated in the platen 19 and in the wall A, this frame is capable of sliding in said openings according to the direction of the optical axis X—X.

On the opposite sides of the frame 33 are secured two journals 35 on which are pivoted the branches 36 of a yoke housed within the frame-carrying box 20, 28, 29, 30, 31, 32. This yoke comprises a cross member 37 pivoting, by means of two journals 38, in the uprights 28, 29 and carrying, in addition to the branches 36, a longer arm 39 acting as a lever for exerting the pressure on the frame at the required moment.

This lever is controlled by the registration claw 6 and carries, for that purpose, at its lower end, a lug 41 on which acts, by a thrust, a nose 42 rigid with said claw. When the lever 39 ceases to be pushed by the nose 42, it is urged to move away from the plate 20, by a flat spring 43 secured to the latter, so that the pressing frame then slightly moves away from the film.

The front branch 28 of the frame-carrying box supports a lock or flat bolt 44 which vertically slides on two screws 45 secured to said branch and which is normally urged downwardly by the action of a spring 46 so as to engage in a notch 47 formed in the fixed pin 25. Consequently, once the door 20, 21 is completely threaded on said pin, the lock 44 automatically engages in the notch 47 and maintains the door in position.

The upper part of the latter is held in vertical position due to the fact that the rear branch 29 is pushed towards the wall A by a claw 48 rigid with a slide-block 49 guided in vertical slideway 50 provided in the wall B.

This upper part of the broken door moreover supports a transparent prism 51 serving to reflect the luminous rays at right angles relatively to the axis X—X; this prism is housed in a casing 52 secured behind the plate 32. Finally, on this casing are pivoted, at 53, the horizontal branches 54 of a yoke serving to guide, by means of its vertical cross member 55, the edge of the film which slightly projects on the front side of the gate 4, between the aperture plate 19 and the member 20. This yoke is, in fact, subjected to the action of springs 56 attached to claws 57 rigid with the branches 54 and to lugs 58 secured to the plate 32, so that the cross member 55, made of hardened steel, slightly presses against the front edge of the film, thus holding the rear edge of the latter constantly pressed against the bottom of the gate 4.

The film is then guided without any lateral play, and is slightly braked, and the images obtained are uniformly disposed in the lateral direction.

The position of the springs 56 is chosen in such a manner that if the yoke 54, 55 is moved about the pivots 53 by seizing it by the claws 57, it can be caused to pivot approximately through a half-revolution and be disengaged, without it returning back, against an abutment 59 secured on the casing 52 of the prism 51. The entrance of the gate is thus free for the introduction of the film; once the latter is placed in position, it suffices to bring the yoke back by again seizing it by its claws 57.

The uprights 28, 29 also support at their upper end the journals of a roll 60 serving to guide the loop E of the film.

The unit composed of the plate 20 and all the members it carries, box and pressing frame, yoke for the suspension of said frame, tripping lock, prism 51, lateral guiding yoke and roll 60 can be folded down horizontally (Fig. 5) about the pin of the hinge 23, 24.

This folding down movement is automatically produced by the downward movement of the slide-block 49 in the slideway 50, said downward movement being controlled by the operator, for instance by means of a pinion (not shown) rigid with a milled knob and meshing with a part of the slide-block forming a rack.

The rear branch 29 is provided, in fact, with a projecting part 61 cut out so as to form inclines $c\ d\ e$ on which acts the claw 48 when moving vertically, and it will be seen that, by lowering, this claw leaves the vertical incline $c$ and presses against the incline $d$, thus compelling the upper part of the door to rock downwardly to the horizontal position (Fig. 5); it then leaves the incline $d$ and can lower still farther until a ground glass prism 62 housed in a casing 63 secured to the slide-block 49 has exactly taken the place previously occupied by the prism 51 in front of the opening 34, which allows the focussing of the lens. The film has then assumed the position indicated in Fig. 5, the loop E having been drawn along and distorted by the casing 63 of the prism 62.

When the operator causes the slide-block 49 and the prism 62 to rise to their position of rest (Fig. 1) the claw 48 encounters the incline $e$ and lifts the upper part of the door, then slides and stops against the vertical incline $c$, again holding the door stationary in its normal position.

During these rocking movements, the lug 41 of the lever 39, cut concentrically with the pin of the hinge 23, 24, slides against the nose 42 of the registration claw 6 which has a corresponding shape.

The control of said claw will now be indicated, which claw must engage in a perforation of the film while the claw 5 disengages therefrom, and, on the contrary, must disengage from the film when the claw 5 is engaged therewith.

The claw 6 is guided through two bearings 64 and 65 secured to the wall B and is connected by a double link 66 to a plate 67 mounted on a shaft 68 which receives a slight rocking movement at the required moments, for instance, by the action of cams (not shown) carried by the main shaft 10.

Independently of this mechanical control, the device comprises a hand control for disengaging the plate 67 from the shaft 68 and causing it to rock at will, so that the simultaneous disengagement of both claws 5 and 6 from the gate 4 can be obtained each time it is desired to introduce a film therein or to remove a film from said gate. For that purpose, the plate 67 is freely mounted on the shaft 68, between a plate 69 pinned on the latter and the base 70 of a long milled knob 71 which can rotate and slide freely and which is pushed towards the plate 67 by a spring 72 taking a bearing on a screw 73 secured on the end of the shaft. The base 70 carries two claws 74 which are normally engaged in holes 75 and 76 formed in the members 67 and 69, thus rendering the knob 71 and the plate 67 rigid with the plate 69 and consequently with the shaft 68; the claw 6 is then actuated mechanically.

When the mechanism of the apparatus is stopped, care being taken to rotate the shaft 10 to a position in which the claw 5 is disengaged from the gate 4, the plate 67 can be released from the plate 69 by pulling the knob 71 so as to disengage the claws 74 from the holes 75, but leaving them engaged in the holes 76; by then rotating the knob slightly in the direction of the arrow $f_1$, the claw 6 is disengaged from the gate 4.

This rotation is limited owing to the fact that the base 70 abuts against the head of a screw 77 secured to the wall B, so that there is no danger of the claw 6 becoming disengaged from the bearing 64.

The gate 4 is thus simultaneously freed from both claws 5 and 6. The knob 71 can moreover be released, its stability being ensured by the claws 74 bearing on the solid parts of the plate 69 (Fig. 6).

When the used film has been removed from the gate and a new film has been introduced therein in its place, it suffices to slightly rotate the knob 71 rearwardly for causing the claws 74 to fall back into the holes 76 and again coupling the mechanical control of the claws.

However, before setting the mechanism in action, it is necessary to adjust the position of the new film in the gate 4 so that the claws 5 and 6 can exactly enter the perforations without any risk whatever of damaging the film. For that purpose, on the wall A, below the entrance of the gate, outside the normal path followed by the film (loop F) a claw 78 is provided on which a perforation is engaged; the position of this reference claw is suitably determined relatively to the positions in which the claws 5 and 6 enter and leave the perforations.

The mechanism is then manipulated so as to engage the registration claw 6 in the perforation corresponding to it, the film is disengaged from the reference claw 78 and the apparatus can then be set in action.

It is to be noted that if an inattentive operator has forgotten to engage the claw 6 in the film, by actuating the knob 71, the plate 67 will nevertheless be automatically coupled with the plate 69 as soon as the mechanism is set in action; in fact, the holes 76 of said plate will be opposite the claws 74, the base 70 being pressed against the head of the screw 77, the spring 72 will cause the claws to enter said holes 76 and the base 70 restored opposite the body of the screw 77 will again be free to rock with the plate 67, the plate 69 and the shaft 68.

It is to be understood that the invention is not limited to the constructional details illustrated and that it includes in its scope all the modifications based on the same principles or using the same characteristic arrangements either in combination or separately.

I claim:

1. A motion picture camera comprising walls, an aperture plate secured to one of said walls, a door arranged to form with said plate a guide for a cinematographic film, said door including two members placed one above the other and connected by a pivotal joint whereby the upper member may be swung downwardly to horizontal position said upper member being constituted by a plate in which is provided a rectangular opening and which carries at the lower part two hinge members engaged in a hinge member rigid with said lower member, said hinge members being fitted with slight friction on a pin rigidly secured to another of said walls and the hinge member of the lower member being assembled with one of the hinge members of the upper member by a circular jointing.

2. A motion picture camera comprising walls, an aperture plate secured to one of said walls, a door arranged to form with said plate a guide for a cinematographic film, said door including two members placed one above the other and connected by a pivotal joint whereby the upper member may be swung downwardly to horizontal position the upper member being constituted by a plate in which is provided a rectangular opening, a box-like part carried by the upper member including two uprights, two stays and a plate having a rectangular opening located opposite the opening of said upper member, and a pressing frame housed within the opening of said plate and so arranged as to slide in the direction of the optical axis.

3. A motion picture camera comprising walls, an aperture plate secured to one of said walls, a door arranged to form with said plate a guide for a cinematographic film, said door including two members placed one above the other and connected by a pivotal joint whereby the upper member may be swung downwardly to horizontal position the upper member being constituted by a plate in which is provided a rectangular opening, a rectangular box-like part including a plate having a rectangular opening located opposite the opening of said upper member, a pressing frame housed within said plate and on two opposite sides of which are secured two journals on which are pivoted the branches of a yoke housed within the frame-carrying box-like part and comprising a cross member pivotally mounted on two journals, rigid with said box, and a lever longer than said branches and arranged to exert a pressure on said pressing frame, a registration claw arranged to engage in the perforations of the film to hold it stationary after each forward movement and means on said claw for controlling said lever.

4. A motion picture camera comprising walls, an aperture plate secured to one of said walls, a door arranged to form with said plate a guide for a cinematographic film, said door including two members placed one above the other and connected by a pivotal joint whereby the upper member may be swung downwardly to horizontal position the upper member being constituted by a plate perforated with a rectangular opening carrying a rectangular box-like part constituted by two uprights, two stays and a plate having a rectangular opening located opposite the opening of said upper member, a spring, the front upright of said box-like part carrying a lock which slides vertically on two screws secured on said upright and normally urged downwardly by said spring so as to engage in a notch formed in a spindle rigidly secured to said wall and adapted to connect the upper member to the lower member.

5. A motion picture camera comprising walls, an aperture plate secured to one of said walls, a door arranged to form with said plate a guide for a cinematographic film, said door including two members placed one above the other and connected by a pivotal joint whereby the upper member may be swung downwardly to horizontal position, a slide-block guided in a vertical slideway provided in said wall, and a claw rigid with said slide-block holding said upper member in vertical position.

6. A motion picture camera comprising walls, an aperture plate secured to one of said walls, a door arranged to form with said plate a guide for a cinematographic film, said door including two members placed one above the other and connected by a pivotal joint whereby the upper member may be swung downwardly to horizontal position, a transparent prism serving to reflect the luminous rays at right angles relatively to the optical axis, and a casing secured at the rear of said upper member housing said prism.

7. A motion picture camera comprising walls, an aperture plate secured to one of said walls, a door arranged to form with said plate a guide for a cinematographic film, said door including two members placed one above the other and connected by a pivotal joint whereby the upper member may be swung downwardly to horizontal position, a transparent prism, a casing secured at the rear of said upper member housing said prism, a yoke having horizontal branches pivoted on said casing and serving to guide, by means of a vertical cross member, the edge of the film which slightly projects on the front side of said guiding gate, between said aperture plate and said upper member, said yoke being subjected to the action of springs attached to claws rigid with said horizontal branches and to lugs secured to said upper member.

8. A motion picture camera comprising walls, an aperture plate secured to one of said walls, a door arranged to form with said plate a guide for a cinematographic film, said door including two members placed one above the other and connected by a pivotal joint whereby the upper member may be swung downwardly to horizontal position, a shaft which receives a slight rocking movement, a plate on said shaft, a registration claw and a double link connecting said claw to said plate.

9. A motion picture camera comprising walls, an aperture plate secured to one of said walls, a door arranged to form with said plate a guide for a cinematographic film, said door including two members placed one above the other and connected by a pivotal joint whereby the upper member may be swung downwardly to horizontal position, a control shaft, a plate secured to said shaft, a crank pin on said plate, a claw for driving the film, including in a rod terminated by an eye which is mounted with slight friction on said crank-pin, a barrel, said rod sliding with some friction through said barrel and the latter being provided with two trunnions so arranged as to allow said barrel to rock about a horizontal axis, in a support secured to the wall, said barrel being extended rearwardly by a fork constituted by two prongs arranged in different vertical planes and respectively bearing by plane and trued inner faces against the top of a milled wheel and against the bottom of another milled wheel, mounted on said crank-pin on either side of said eye of the claw.

JEAN MÉRY.